US010104555B2

(12) United States Patent
Dain et al.

(10) Patent No.: US 10,104,555 B2
(45) Date of Patent: Oct. 16, 2018

(54) SYSTEMS AND METHODS FOR A COGNITIVE RADIO HAVING ADAPTABLE CHARACTERISTICS

(71) Applicant: Shared Spectrum Company, Vienna, VA (US)

(72) Inventors: Dmitry Dain, Herndon, VA (US); Igor Bazarov, Herndon, VA (US); Eugene Livis, Vienna, VA (US); Mark Allen McHenry, McLean, VA (US)

(73) Assignee: Shared Spectrum Company, Vienna, VA (US)

( * ) Notice: Subject to any disclaimer, the term of this patent is extended or adjusted under 35 U.S.C. 154(b) by 0 days.

(21) Appl. No.: 14/305,159

(22) Filed: Jun. 16, 2014

(65) Prior Publication Data

US 2015/0296382 A1 Oct. 15, 2015

Related U.S. Application Data

(63) Continuation of application No. 13/462,302, filed on May 2, 2012, now Pat. No. 8,767,556, which is a (Continued)

(51) Int. Cl.
*H04W 4/00* (2018.01)
*H04W 16/14* (2009.01)
(Continued)

(52) U.S. Cl.
CPC ....... *H04W 16/14* (2013.01); *H04W 72/0453* (2013.01); *H04W 72/08* (2013.01); *H04W 88/08* (2013.01)

(58) Field of Classification Search
CPC ..... H04W 16/10; H04W 16/14; H04W 28/00; H04W 84/10
See application file for complete search history.

(56) References Cited

U.S. PATENT DOCUMENTS 3,893,064 A 7/1975 Nishihara et al.
3,935,572 A 1/1976 Broniwitz et al.
(Continued)

FOREIGN PATENT DOCUMENTS

EP 1220499 7/2002
EP 1571861 9/2005
(Continued)

OTHER PUBLICATIONS

Ackland,"High Performance Cognitive Radio Platform with Integrated Physical and Network Layer Capabilities", Network Centric Cognitive Radio, 2005.
(Continued)

*Primary Examiner* — Kevin C Harper
(74) *Attorney, Agent, or Firm* — Morris & Kamlay LLP

(57) ABSTRACT

Systems and methods for configuring a network of radios for dynamic spectrum access are described. A network radio can include hardware and/or software modules for detecting a radio environment and negotiating common communications channels with a plurality of other radios in the network. Network radio behavior can be defined by a plurality of predefined policies which are used in combination with the information about the radio environment to select common operating parameters.

29 Claims, 11 Drawing Sheets

Related U.S. Application Data continuation of application No. 11/839,496, filed on Aug. 15, 2007, now Pat. No. 8,184,653.

(51) Int. Cl.
*H04W 72/04* (2009.01)
*H04W 72/08* (2009.01)
*H04W 88/08* (2009.01)

(56) References Cited

U.S. PATENT DOCUMENTS

| | | |
|---|---|---|
| 4,107,613 A | 8/1978 | Queen et al. |
| 4,119,964 A | 10/1978 | Johannsen et al. |
| 4,227,255 A | 10/1980 | Carrick et al. |
| 4,305,150 A | 12/1981 | Richmond |
| 4,398,220 A | 8/1983 | Satoh |
| 4,501,020 A | 2/1985 | Wakeman |
| 4,672,657 A | 6/1987 | Dershowitz |
| 4,736,453 A | 4/1988 | Schloemer |
| 4,783,780 A | 11/1988 | Alexis |
| 4,803,703 A | 2/1989 | DeLuca et al. |
| 4,878,238 A | 10/1989 | Rash et al. |
| 4,881,271 A | 11/1989 | Yamauchi et al. |
| 4,918,730 A | 4/1990 | Schulze |
| 4,977,612 A | 12/1990 | Wilson |
| 5,040,238 A | 8/1991 | Comroe et al. |
| 5,093,924 A | 3/1992 | Toshiyuki et al. |
| 5,093,927 A | 3/1992 | Shanley |
| 5,142,690 A | 8/1992 | McMullan, Jr. et al. |
| 5,142,691 A | 8/1992 | Freeburg et al. |
| 5,151,747 A | 9/1992 | Nourrcier |
| 5,155,590 A | 10/1992 | Beyers, II et al. |
| 5,162,937 A | 11/1992 | Heidemann et al. |
| 5,177,604 A | 1/1993 | Martinez |
| 5,177,767 A | 1/1993 | Kato |
| 5,179,722 A | 1/1993 | Gunmar et al. |
| 5,203,012 A | 4/1993 | Patsiokas et al. |
| 5,225,902 A | 7/1993 | McMullan, Jr. |
| 5,239,676 A | 8/1993 | Strawczynski et al. |
| 5,247,701 A | 9/1993 | Comroe et al. |
| 5,260,974 A | 11/1993 | Johnson et al. |
| 5,271,036 A | 12/1993 | Lobert et al. |
| 5,276,908 A | 1/1994 | Koohgoli et al. |
| 5,325,088 A | 6/1994 | Willard et al. |
| 5,375,123 A | 12/1994 | Andersson et al. |
| 5,402,523 A | 3/1995 | Berg |
| 5,410,737 A | 4/1995 | Jones |
| 5,412,658 A | 5/1995 | Arnold et al. |
| 5,422,912 A | 6/1995 | Asser et al. |
| 5,422,930 A | 6/1995 | McDonald et al. |
| 5,428,819 A | 6/1995 | Wang et al. |
| 5,448,753 A | 9/1995 | Ahl et al. |
| 5,475,868 A | 12/1995 | Duque-Anton et al. |
| 5,497,505 A | 3/1996 | Koohgoli et al. |
| 5,502,688 A | 3/1996 | Recchione et al. |
| 5,511,233 A | 4/1996 | Otten |
| 5,548,809 A | 8/1996 | Lemson |
| 5,553,081 A | 9/1996 | Downey et al. |
| 5,585,850 A | 12/1996 | Schwaller |
| 5,608,727 A | 3/1997 | Perreault et al. |
| 5,655,217 A | 8/1997 | Lemson |
| 5,668,747 A | 9/1997 | Ohashi |
| 5,748,678 A | 5/1998 | Valentine et al. |
| 5,752,164 A | 5/1998 | Jones |
| 5,794,151 A | 8/1998 | McDonald et al. |
| 5,822,686 A | 10/1998 | Lundberg et al. |
| 5,828,948 A | 10/1998 | Almgren et al. |
| 5,850,605 A | 12/1998 | Souissi et al. |
| 5,862,487 A | 1/1999 | Fujii et al. |
| 5,884,181 A | 3/1999 | Arnold et al. |
| 5,889,821 A | 3/1999 | Arnstein et al. |
| 5,939,887 A | 8/1999 | Schmidt et al. |
| 5,943,622 A | 8/1999 | Yamashita |
| 5,960,351 A | 9/1999 | Przelomiec |
| 5,999,561 A | 12/1999 | Naden et al. |
| 6,011,970 A | 1/2000 | McCarthy |
| 6,044,090 A | 3/2000 | Grau et al. |
| 6,047,175 A | 4/2000 | Trompower |
| 6,049,707 A | 4/2000 | Buer et al. |
| 6,049,717 A | 4/2000 | Dufour et al. |
| 6,127,967 A | 10/2000 | Ghazvinian |
| 6,141,557 A | 10/2000 | Dipiazza |
| 6,147,553 A | 11/2000 | Kolanek |
| 6,154,501 A | 11/2000 | Friedman |
| 6,157,811 A | 12/2000 | Dent |
| 6,178,328 B1 | 1/2001 | Tang et al. |
| 6,188,873 B1 | 2/2001 | Wickman et al. |
| 6,208,858 B1 | 3/2001 | Antonio et al. |
| 6,240,274 B1 | 5/2001 | Izadpanah |
| 6,269,331 B1 | 7/2001 | Alanara et al. |
| 6,295,289 B1 | 9/2001 | Ionescu et al. |
| 6,304,140 B1 | 10/2001 | Thron et al. |
| 6,356,555 B1 | 3/2002 | Rakib et al. |
| 6,380,879 B2 | 4/2002 | Kober et al. |
| 6,522,885 B1 | 2/2003 | Tang et al. |
| 6,526,264 B2 | 2/2003 | Sugar et al. |
| 6,529,715 B1 | 3/2003 | Kitko et al. |
| 6,570,444 B2 | 5/2003 | Wright |
| 6,597,301 B2 | 7/2003 | Cerra |
| 6,606,593 B1 | 8/2003 | Jarvinen et al. |
| 6,615,040 B1 | 9/2003 | Benveniste |
| 6,625,111 B1 | 9/2003 | Sudo |
| 6,671,503 B1 | 12/2003 | Niwamoto |
| 6,675,012 B2 | 1/2004 | Gray |
| 6,687,492 B1 | 2/2004 | Sugar et al. |
| 6,690,746 B1 | 2/2004 | Sills et al. |
| 6,697,436 B1 | 2/2004 | Wright et al. |
| 6,700,450 B2 | 3/2004 | Rogers |
| 6,714,605 B2 | 3/2004 | Sugar et al. |
| 6,714,780 B1 | 3/2004 | Antonio et al. |
| 6,728,517 B2 | 4/2004 | Sugar et al. |
| 6,771,957 B2 | 8/2004 | Chitrapu |
| 6,785,520 B2 | 8/2004 | Sugar et al. |
| 6,792,268 B1 | 9/2004 | Benveniste et al. |
| 6,799,020 B1 | 9/2004 | Heidmann et al. |
| 6,816,832 B2 | 11/2004 | Alanara et al. |
| 6,847,678 B2 | 1/2005 | Berezdivin et al. |
| 6,850,735 B2 | 2/2005 | Sugar et al. |
| 6,850,764 B1 | 2/2005 | Patel |
| 6,862,456 B2 | 3/2005 | Sugar et al. |
| 6,904,269 B1 | 6/2005 | Deshpande et al. |
| 6,941,110 B2 | 9/2005 | Kloper et al. |
| 6,952,563 B2 | 10/2005 | Brown et al. |
| 6,959,178 B2 | 10/2005 | Macedo et al. |
| 6,965,762 B2 | 11/2005 | Sugar et al. |
| 6,990,087 B2 | 1/2006 | Rao et al. |
| 6,993,440 B2 | 1/2006 | Anderson et al. |
| 7,013,345 B1 | 3/2006 | Brown et al. |
| 7,035,593 B2 | 4/2006 | Miller et al. |
| 7,054,625 B2 | 5/2006 | Kawasaki et al. |
| 7,058,383 B2 | 6/2006 | Sugar et al. |
| 7,089,014 B2 | 8/2006 | Brown et al. |
| 7,227,974 B2 | 6/2007 | Kamijo et al. |
| 7,260,156 B2 | 8/2007 | Krupezevic et al. |
| 7,269,151 B2 | 9/2007 | Diener et al. |
| 7,313,393 B2 | 12/2007 | Chitrapu |
| 7,342,876 B2 | 3/2008 | Bellur et al. |
| 7,424,268 B2 | 9/2008 | Diener et al. |
| 7,428,270 B1 | 9/2008 | Dubuc et al. |
| 7,457,295 B2 | 11/2008 | Saunders et al. |
| 7,463,952 B2 | 12/2008 | Bidou et al. |
| 7,483,700 B2 | 1/2009 | Buchwald et al. |
| 7,532,857 B2 | 5/2009 | Simon |
| 7,564,816 B2 | 7/2009 | McHenry et al. |
| 7,610,036 B2 | 10/2009 | Teo et al. |
| 7,613,148 B2 | 11/2009 | Hong et al. |
| 7,616,604 B2 | 11/2009 | Abdelhamid et al. |
| 20,100,105 | 4/2010 | McHenry et al. |
| 7,742,764 B2 | 6/2010 | Gillig et al. |
| 7,826,839 B1 | 11/2010 | Nicholas |
| 8,000,715 B2 | 8/2011 | Melpignano et al. |
| 2001/0013834 A1 | 8/2001 | Yamazaki |
| 2001/0046843 A1 | 11/2001 | Alanara et al. |
| 2002/0002052 A1 | 1/2002 | McHenry |

(56) References Cited

U.S. PATENT DOCUMENTS

| | | |
|---|---|---|
| 2002/0196842 A1 | 12/2002 | Onggosanusi et al. |
| 2003/0020651 A1 | 1/2003 | Crilly et al. |
| 2003/0027577 A1 | 2/2003 | Brown et al. |
| 2003/0081628 A1 | 5/2003 | Sugar et al. |
| 2003/0099218 A1 | 5/2003 | Tillotson |
| 2003/0165187 A1 | 9/2003 | Tesfai et al. |
| 2003/0181173 A1 | 9/2003 | Sugar et al. |
| 2003/0181211 A1 | 9/2003 | Razavilar et al. |
| 2003/0181213 A1 | 9/2003 | Sugar et al. |
| 2003/0198200 A1 | 10/2003 | Diener et al. |
| 2003/0203743 A1 | 10/2003 | Sugar et al. |
| 2004/0017268 A1 | 1/2004 | Rogers |
| 2004/0023674 A1 | 2/2004 | Miller |
| 2004/0047324 A1 | 3/2004 | Diener |
| 2004/0072546 A1 | 4/2004 | Sugar et al. |
| 2004/0121753 A1 | 6/2004 | Sugar et al. |
| 2004/0136466 A1 | 7/2004 | Tesfai et al. |
| 2004/0142696 A1 | 7/2004 | Saunders et al. |
| 2004/0161027 A1 | 8/2004 | Ferguson |
| 2004/0203474 A1 | 10/2004 | Miller et al. |
| 2004/0242276 A1* | 12/2004 | Kashiwagi ............... H04B 7/04 455/562.1 |
| 2005/0070294 A1 | 3/2005 | Lyle et al. |
| 2005/0119006 A1 | 6/2005 | Cave et al. |
| 2005/0192011 A1 | 9/2005 | Hong et al. |
| 2005/0213580 A1 | 9/2005 | Mayer et al. |
| 2005/0213763 A1 | 9/2005 | Owen et al. |
| 2005/0270218 A1 | 12/2005 | Chiodini |
| 2006/0075467 A1 | 4/2006 | Sanda et al. |
| 2006/0126536 A1 | 6/2006 | Patel et al. |
| 2006/0211395 A1 | 9/2006 | Waltho |
| 2006/0220944 A1 | 10/2006 | Ikeda |
| 2006/0234716 A1 | 10/2006 | Vesterinen et al. |
| 2006/0246836 A1 | 11/2006 | Simon |
| 2006/0247505 A1 | 11/2006 | Siddiqui |
| 2007/0008875 A1 | 1/2007 | Gerhardt et al. |
| 2007/0019603 A1 | 1/2007 | Gerhardt et al. |
| 2007/0046467 A1 | 3/2007 | Chakraborty et al. |
| 2007/0047474 A1 | 3/2007 | Anderson |
| 2007/0053410 A1 | 3/2007 | Mahonen et al. |
| 2007/0076745 A1 | 4/2007 | Manjeshwar et al. |
| 2007/0091998 A1 | 4/2007 | Woo et al. |
| 2007/0100922 A1 | 5/2007 | Ashish |
| 2007/0165577 A1 | 7/2007 | Baker et al. |
| 2007/0165664 A1 | 7/2007 | Gerhardt et al. |
| 2007/0165695 A1 | 7/2007 | Gerhardt et al. |
| 2007/0183338 A1 | 8/2007 | Singh et al. |
| 2007/0253394 A1 | 11/2007 | Horiguchi et al. |
| 2007/0254596 A1 | 11/2007 | Corson et al. |
| 2008/0010040 A1 | 1/2008 | McGehee |
| 2008/0014880 A1 | 1/2008 | Hyon et al. |
| 2008/0022355 A1 | 1/2008 | Khosravi et al. |
| 2008/0031143 A1 | 2/2008 | Ostrosky |
| 2008/0069079 A1 | 3/2008 | Jacobs |
| 2008/0089279 A1* | 4/2008 | Hu ............... H04W 16/14 370/329 |
| 2008/0144524 A1* | 6/2008 | Hershey ............... H04W 72/02 370/254 |
| 2008/0228446 A1 | 9/2008 | Baraniuk et al. |
| 2008/0259859 A1 | 10/2008 | Cordeiro et al. |
| 2008/0261537 A1 | 10/2008 | Chen |
| 2008/0267259 A1 | 10/2008 | Budampati et al. |
| 2008/0284648 A1 | 11/2008 | Takada et al. |
| 2009/0040986 A1 | 2/2009 | Cordeiro et al. |
| 2009/0074033 A1 | 3/2009 | Kattwinkel |
| 2009/0161610 A1 | 6/2009 | Kang et al. |
| 2009/0190508 A1 | 7/2009 | Kattwinkel |
| 2009/0252178 A1 | 10/2009 | Huttunen et al. |
| 2010/0008312 A1 | 1/2010 | Viswanath |
| 2010/0041338 A1 | 2/2010 | Hannagan |
| 2010/0097952 A1 | 4/2010 | McHenry |
| 2010/0220618 A1 | 9/2010 | Kwon et al. |
| 2010/0296078 A1 | 11/2010 | Forrer et al. |
| 2011/0051645 A1 | 3/2011 | Hong et al. |

FOREIGN PATENT DOCUMENTS

| | | |
|---|---|---|
| GB | 2260879 | 4/1993 |
| WO | 2004/054280 | 6/2004 |
| WO | 2006/101489 | 9/2006 |
| WO | 2007/034461 | 3/2007 |
| WO | 2007/058490 | 5/2007 |
| WO | 2007/094604 | 8/2007 |
| WO | 2007/096819 | 8/2007 |
| WO | 2007/108963 | 9/2007 |
| WO | 2007/108966 | 9/2007 |
| WO | 2007/109169 | 9/2007 |
| WO | 2007/109170 | 9/2007 |

OTHER PUBLICATIONS

Cabric et al.,"Implementation issues in spectrum sensing for cognitive radios", Signals Systems and Computers, 2004. Conference record of the 38th Asilomar Conference on Pacific Grove, CA, USA, Nov. 7-10, 2004, NJ, USA, vol. 1, pp. 772-776, sections I-IV, Nov. 7, 2004.

Ditri,"Dynamic spectrum access moves to the forefront", 2008.

EPO,"Supplementary European Search Report", for European Application No. 01 94 5944, dated Apr. 24, 2009.

Erpek,"Location-based Propagation Modeling for Opportunistic Spectrum Access in Wireless Networks", 2007.

European Patent Office,"European Examination Report", in Application No. PCT/US2007022356.

Falconer et al.,"Frequency Domain Equalization for Single-Carrier Broadband Wireless Systems", IEEE Communications Magazine, Apr. 2002.

Han et al.,"Spectral correlation based on signal detection method for spectrum sensing in IEEE 802.22 WRAN systems", Advanced Communication Technology, 2006. ICACT 2006. The 8th International Conference, vol. 3, Feb. 20-22, 2006, NJ, USA, pp. 1765-1770.

Leu,"Ultra sensitive TV detector measurements", New Frontiers in Dynamic Spectrum Access Networks, 2005.

Liu et al.,"Project: IEEE P802.15 Working Group for Wireless Personal Area Networks (WPANs)", pp. 1-25, May 10, 2006.

Mahbubani et al.,"Dynamic channel allocation in wireless ad-hoc networks", pp. 1-12.

Marshall et al.,"XG Dynamic Spectrum Experiments, Findings and Plans Panel", DoD Spectrum Summit, 2006.

McHenry,"Adaptive Spectrum Technology: Findings From the DARPA XG Project", 2007.

McHenry,"Creation of a Spectrum Sharing Innovation Test-Bed and the President's Spectrum Policy Initiative Spectrum Sharing Innovation Test-Bed", 2006.

McHenry,"Dynamic Spectrum Sharing Presentation", 2005.

McHenry,"The probe spectrum access method", New Frontiers in Dynamic Spectrum Access Networks. DySPAN 2005. 2005 First IEEE International Symposium on, 2005, pp. 346-351.

McHenry,"XG DSA Radio System", New Frontiers in Dynamic Spectrum Access Networks, 2008.

McHenry,"XG dynamic spectrum access field test results [Topics in Radio Communications]", Communications Magazine, IEEE, No. vol. 45, Issue: 6., 2007.

Perich,"Experimental Field Test Results on Feasibility of Declarative Spectrum Management", 3rd IEEE International Symposium on New Frontiers in Dynamic Spectrum Access Networks, 2008.

Perich,"Policy-Based Network Management for NeXt Generation Spectrum Access Control", 2nd IEEE International Symposium on New Frontiers in Dynamic Spectrum Access Networks, 2007.

Ramanathan et al.,"Next Generation (XG) Architecture and Protocol Development (XAP)", 2005.

Rohde et al.,"RF/Microwave Circuit Design for Wireless Applications", published by Wiley-Interscience, Mar. 2000.

Seelig,"A Description of the Aug. 2006 XG Demonstrations at Fort A.P. Hill", 2nd IEEE International Symposium on New Frontiers in Dynamic Spectrum Access Networks, 2007.

SSC,"Products", 2007.

(56) References Cited

OTHER PUBLICATIONS

SSC,"Shared Spectrum Company Successfully Demonstrates neXt Generation (XG) Wireless Communications System", 2006.
SSC,"Shared Spectrum Company to Demonstrate XG Radio Technology at IEEE DYSPAN Conference", 2007.
SSC,"Shared Spectrum Company to Introduce Dynamic Spectrum Access Technology at WIMAX Conference", 2007.
SSC,"Thales Communications and Shared Spectrum Company Team to Add Dynamic Spectrum Access Technology to Military Radios", 2007.
Steadman,"Dynamic Spectrum Sharing Detectors", 2nd IEEE International Symposium on New Frontiers in Dynamic Spectrum Access Networks, 2007.
Steenstrup,"Channel Selection among Frequency-Agile Nodes in Multihop Wireless Networks", 2005.
Tenhula,"Dynamic Spectrum Sharing Bid, Lease and MVNO/MVNE: Spectrum Options for Operators", 2006.
Tenhula,"Policy-Based Spectrum Access Control for Public Safety Cognitive Radio Systems", 2008.
Tenhula,"Secondary Markets and Spectrum Leasing", UTC Telecom 2006, Tampa, FL, May 23, 2006.
Tenhula,"Shared Spectrum Company Successfully Demonstrates Next Generation (XG) Wireless System", 2006.
Tenhula,"Update on XG and Follow-on Programs: Cognitive Radio for Tactical and Public Safety Communications", 2008.
USPTO,"Office Action", Re.: U.S. Appl. No. 12/541,621.
USPTO,"Office Action", Re.: U.S. Appl. No. 12/541,624.
WIPO,"International Search Report", for Application No. PCT/US07/21940, dated Feb. 14, 2008.
WIPO,"International Search Report", for Application No. PCT/US01/14853, dated Feb. 8, 2002.
WIPO,"International Search Report", for Application No. PCT/US07/11414, dated Mar. 18, 2008.
WIPO,"International Search Report", for Application No. PCT/US04/17883 filed Jun. 9, 2004, dated Mar. 25, 2005.
WIPO,"International Search Report", for Application No. PCT/US07/22356 filed Oct. 19, 2007, dated Oct. 6, 2008.
WIPO,"International Search Report", for Application No. PCT/US08/073194, dated Sep. 28, 2009.
WIPO,"PCT Office Communication", for Application No. PCT/US2008/073193, dated Jun. 2, 2009.
XG VIP Demo,"Anticipated XG VIP Demo Invitees", 2006.
Zeng,"Maximum-Minimum Eigenvalue Detection for Cognitive Radio", Personal, Indoor and Mobile Radio Communications, IEEE 18th International Symposium on, 2007, pp. 1-5.
Zhao,"Distributed coordination in dynamic spectrum allocation networks", New Frontiers in Dynamic Spectrum Access Networks. DySPAN 2005. First IEEE International Symposium on, 2005, pp. 259-268.
Zheng,"Device-centric spectrum management", New Frontiers in Dynamic Spectrum Access Networks. DySPAN 2005. 2005 First IEEE International Symposium on, 2005, pp. 56-65.
Zhou et al.,"Detection timing and channel selection for periodic spectrum sensing in cognitive radio", 2008 IEEE, p. 1-5.

\* cited by examiner

| Parameter | Value | Used By |
|---|---|---|
| Frequency Low | 306 MHz | System wide |
| Frequency High | 407 MHz | System wide |
| Channel Size | 1.25 MHz | System wide |
| NodeId | 0 | Rendezvous & Neighborhood |
| MaxTxPower | 38 dB | DeviceRadio |
| MaxNodes | 10 | Neighborhood |
| UpdateChannelTime | 100 msec | SpecExec |
| RequestedScansPerSec | 10 sec | DeviceDetector for ScanScheduler |
| ScanTimeout | 3 sec | SpecExec to calculate Time To Live |
| StrongDetectionThreshold | 14 dB | RadioUDP and Narrow-Band Detector |
| NodeTimeout | 3 sec | Neighborhood for Watchdog |
| MaxRendChannelsToCheckAtOnce | 10 | Rendezvous |
| AllowRendezvousToForceChanSwitch | 1 | Rendezvous |
| AllowedFreqMin | N/A | N/A |
| AllowedFreqMax | N/A | N/A |

*FIG. 9*

| Parameter | Value | Used By |
|---|---|---|
| DeviceEnable | 1 for Narrow-Band; 0 for FFT | System wide |
| WatchdogMsec | 10000 for Narrowband; 1000 for FFT | Detector |
| MaxPrimariesSupported | 200 | Not used |
| MaxBinsPerScan | 4096 | Spectrum Exec for RxDataBigBuffer |
| ScanBinSize | 25 kHz | Spectrum Exec for detectionResults and to determine max bins per scan |
| ScanTime | 40 msec | Not used |
| HwHeartbeat | 3000 | Detector |
| FFTPoints | 4 | Detector |
| MaxBinsPerScan | 4096 | Detector |
| Scans per request | 5 | Wide-band FFT detector only |

*FIG. 10*

SYSTEMS AND METHODS FOR A COGNITIVE RADIO HAVING ADAPTABLE CHARACTERISTICS

CROSS-REFERENCE TO RELATED APPLICATIONS

This application is a continuation of U.S. application Ser. No. 13/462,302, filed May 2, 2012, which is a continuation of U.S. application Ser. No. 11/839,496, filed Aug. 15, 2007, now U.S. Pat. No. 8,184,653, the disclosure of each of which is incorporated by reference in its entirety.

GOVERNMENT INTERESTS

The work leading to this invention was funded in part by the Defense Advanced Research Projects Agency (DARPA), grant number: FA8750-05-C-0150. The U.S. Government may have certain rights in this invention.

TECHNICAL FIELD

The following is related to a radio frequency (RF) device, operable in a network, that dynamically adapts to its environment to establish and maintain communications with other radios in the network.

BACKGROUND

Cellular phones, personal digital assistants, walkie-talkies, garage door openers, computers, routers and other communication devices all incorporate radio technology to establish and maintain communications over the air. Some RF devices, such as cordless telephones, may automatically search for a channel to establish communications and then release the channel when the radio is finished. These radios may operate according to rules, parameters and limitations imposed upon them by government regulation, an owner or operator, a network, radio frequency requirements or limitations of the physical environment. Most of these radios, however, are unable to automatically adapt to significant or challenging changes within the network or environment.

Some of these devices operate within a network, which may be interconnected to other networks such as a public switched telephone network or the Internet. A radio may be part of a network over which it sends and receives information to other radios or devices. A networked radio device typically does not possess the capability of adapting to its operating environment without manual intervention by a user (e.g., by a user manually tuning it to another frequency or channel that has improved reception) or without receiving rudimentary signaling information and instructions from its network.

Networked radios designed to operate within one particular band or sets of particular channels cannot operate outside of the designated band or channels without appropriate authorization from regulatory authorities or spectrum owners. For example, a radio may search a specified band to find an open channel for communications with the network. The radio will sequentially or randomly step or hop through the band until an open channel is found or an indication is given (e.g., through a control signal) that the network is otherwise busy (e.g., no channels are available). Such a radio, however, does not determine a new band or frequency range from which to search for channels if a channel is not found. The radio either works within its prescribed frequency band according to its fixed characteristics (such as transmit power, bandwidth, and modulation scheme) or it does not work at all.

If a typical radio confronts harmful interference, then its communications signals will not be transmitted or received. The radio also might receive a command from a base station to shut down for any number of reasons. For example, under U.S. government regulations, radios operating on certain frequencies in the 5 GHz band must cease transmissions on that channel within a specified time from the detection of radar signals, which have priority over radio transmissions. A typical radio, however, is not able to adjust, or is not agile in the sense that it can determine on its own how to overcome interference problems. Further, if the radio encounters different parameters or a change within its environment that demands different parameters, then the radio were unable to determine the parameters impacted or what behavioral modifications should be made.

For example, public safety radios used by firefighters often have problems working in the basements of buildings on a frequency assigned to the radio. If the radio is able to dynamically sense its environment and adjust its frequency, modulation, power and network parameters, then the radio would be able to maintain connectivity even under challenging conditions. Radios that do not have a dynamic capability to adapt to the environmental and user changes result in a loss of service. Moreover, if regulatory parameters change, then the radios become incapable of being re-programmed to support new rule-sets without costly refurbishing at a facility or location away from the users.

Some radios, known as software-defined radios, can be reconfigured to adapt to a changing environment. These radios, however, are not able to dynamically adjust their operating behavior outside of a predetermined, fixed set of parameters without uploading new software to the radio or modifying its hardware. Furthermore, these radios generally are not able to achieve performance objectives aside from normal communications, such as avoiding interference or conversely, maintaining communications even at the expense of causing interference to radios outside the network or with lower priority.

Other radios use simple spectrum access techniques generally to operate within a single frequency band and strive to achieve basic communications within narrow slices of unused spectrum. These radios/methods, however, are not suitable for operating across a broad cross section of frequency bands.

BRIEF DESCRIPTION OF THE DRAWINGS

FIG. 9 illustrates an example policy file.

FIG. 10 illustrates and example hardware configuration file.

The headings provided herein are for convenience only and do not necessarily affect the scope or meaning of the claimed invention.

DETAILED DESCRIPTION

In a broad sense, systems and methods for configuring a radio are disclosed in detail below. The systems and methods described herein can efficiently detect environmental conditions and configure the radio in response.

System Functional Overview

The system and methods disclosed herein can operate according to dynamic spectrum access principles. A networked radio node can dynamically adapt to its channel and/or RF environment to maintain reliable communications with other network radios, and can do so without interference to non-network (i.e., non-cooperative) radios. Furthermore, a radio node can operate within certain policy constraints, which may vary depending upon geographic location, time of day, regulatory requirements and other situational factors.

In some embodiments, a radio node can operate over a very wide bandwidth or in multiple frequency bands, by rapidly detecting interference, adjusting its operating frequency, power, occupied bandwidth or other parameters when it does so. The software executing on the radio can use a detector to sense its channel and/or RF environment by periodically or continually scanning some or all of the spectrum for channels that are either clear for use, off-limits due to interference or regulatory restrictions, or have other radio signals operating on them. With this information, the radio software can maintain a list of candidate channels that it may use to communicate with other radio nodes.

Radio nodes within a certain operating region may sense different RF characteristics of their channel and/or RF environment. Based on this sensed information, a negotiation ("rendezvous") is performed among the nodes in order to select a common operating channel. An operating channel selected can be one that has improved performance. When non-cooperative interference (e.g., interference from a RF source outside of the network) appears within a network or a subnetwork of radio nodes, a new rendezvous operation may be performed resulting in a new operating channel for all or most radio nodes. Detection of non-cooperative interference by one radio node in a network does not require that a new operating frequency will be used by its entire network of nodes; rather the objective is to maintain communication for the majority of nodes. For example, if only one or a few out of many radio nodes detect interference, those nodes may cease communication while other nodes (which remain out of range of interference) can continue operating. In some embodiments, radio nodes can be configured to not interfere with other non-cooperative nodes and can maintain reliable communications subject to the non-interference and policy constraints.

Figure 1A:
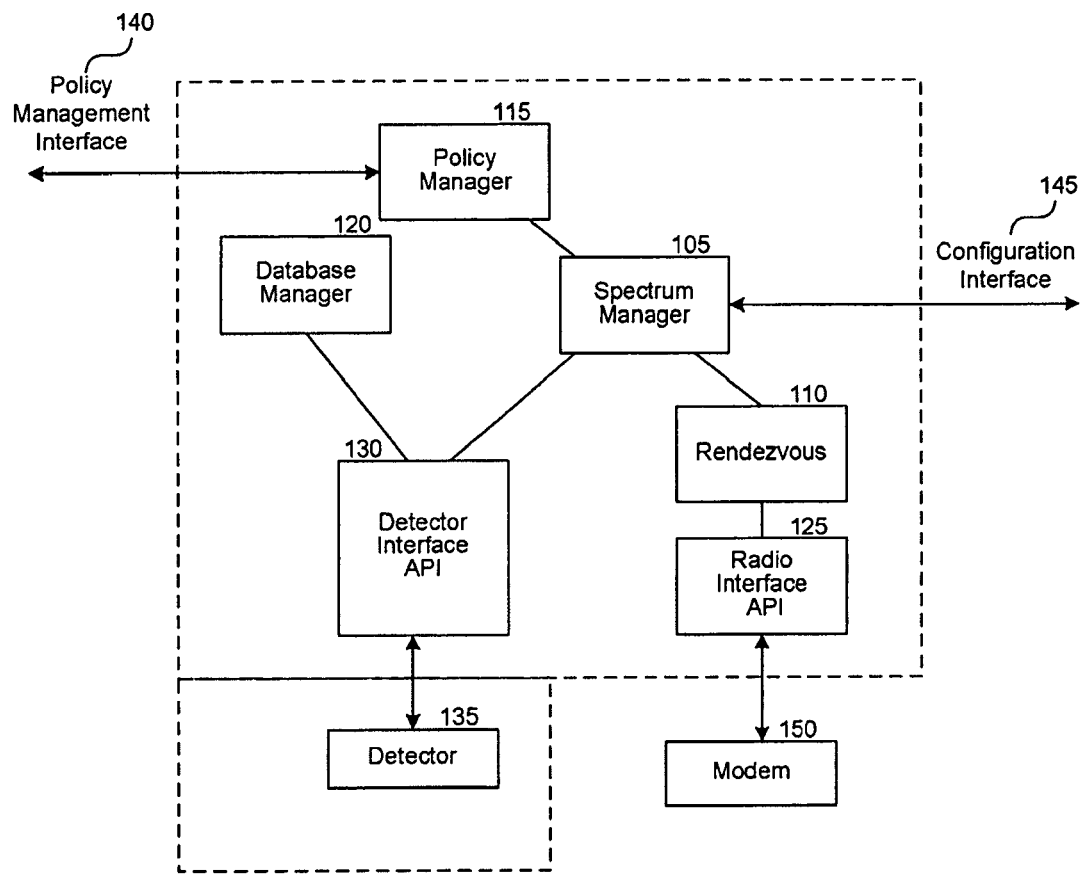
FIG. 1A illustrates the primary software modules and hardware components of a cognitive radio.

The principal software modules, hardware components and application programmer interfaces (APis) of one example embodiment are illustrated in FIG. 1A. These software modules include spectrum manager 105, rendezvous 110, policy manager 115, and database manager 120. Rendezvous 110 can coordinate with other network radio nodes while complying with non-interference requirements. Policy manager 115 can inform spectrum manager 105 of any policy constraints. Detector interface API 130 provides detector 135 scan information to spectrum manager 105, and database manager 120 can provide persistent storage for detector results and other information.

Systems and methods for performing channel and/or RF environment detection are further described in co-pending U.S. patent application Ser. No. 11/839,503, filed Aug. 15, 2007, titled "METHODS FOR DETECTING AND CLASSIFYING SIGNALS TRANSMITTED OVER A RADIO FREQUENCY SPECTRUM," now U.S. Pat. No. 8,055,204, the contents of which are hereby incorporated by reference in their entirety.

The principal APIs include the radio interface API 125 and the detector interface API 130. In some embodiments, the radio interface API 125 is used by a radio hardware manufacturer for integrating the radio software modules and the radio hardware, such as a modem 150. Radio interface API 125 can provide interfaces for configuration, data communication, and status. In some embodiments, the detector interface API 130 can also be used by a radio manufacturer for integrating a detector 135. Detector interface API 130 can be used to provide interfaces for controlling signal detection. As illustrated in FIG. 1A, multiple software configuration interfaces can be included, such as policy management interface 140 and configuration interface 145. Because the radio software architecture is modular, a third-party can utilize other proprietary or standardized modules or hardware.

The functionality of the principal modules of the radio is described in more detail below and further illustrated in FIG. 1B. While the description herein is provided with reference to certain software and hardware embodiment, the functions described can be performed by any combination of hardware, software, or firmware operating alone or in combination.

Spectrum Manager

Figure 1B:
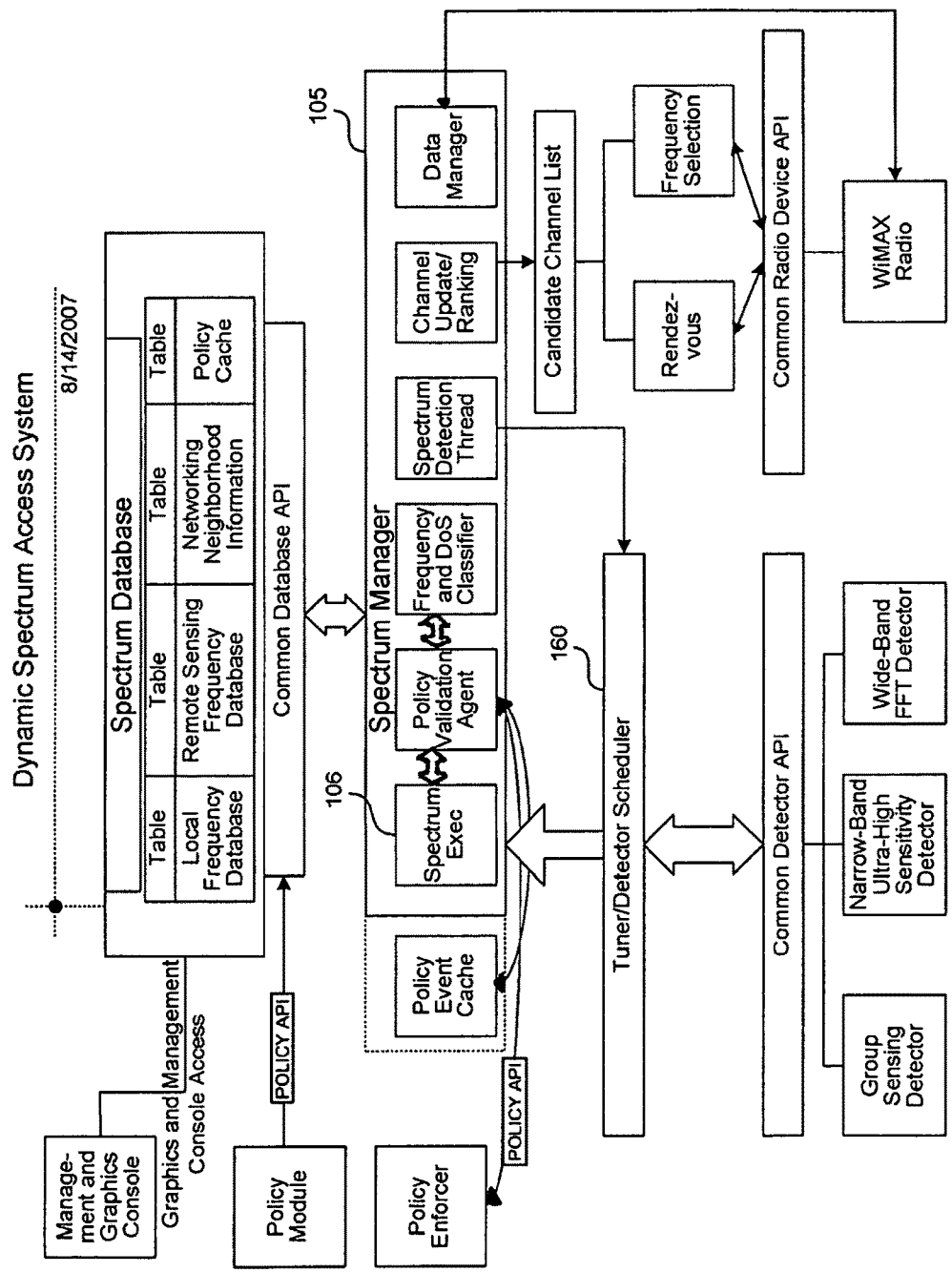
FIG. 1B illustrates the primary components of a cognitive radio in further detail.

Referring now to both FIGS. 1A and 1B, spectrum manager 105 can use information from the detector interface API 130 as well as the policy manager 115 to manage frequency spectrum usage to maintain reliable communications while avoiding interference and complying with any other policy constraints that may be imposed. The spectrum manager 105, through scheduler 160, can control the detector 135 and modem 150 to ensure conformance with radio policies and to control detection timing. For example, spectrum manager 105 can also maintain information that rendezvous 110 can use to negotiate an operating frequency with other networked radios. Spectrum manager 105 can maintain list of candidate channels that rendezvous 110 may use to negotiate an operating frequency with other network radios. Spectrum manager 105 can use scan information from detector interface API 130 as well as policy information to maintain the candidate channel list. Spectrum manager 105 can also maintain or access channel information as seen by neighboring network radio nodes.

Rendezvous

The rendezvous subsystem 110 establishes a control channel over which an operating frequency is determined for a particular network of radio nodes. Rendezvous behavior can depend on the type of radio node. In some embodiments, two radio node types are supported: base station (BS) nodes and subscriber (SU) nodes.

Figure 2:
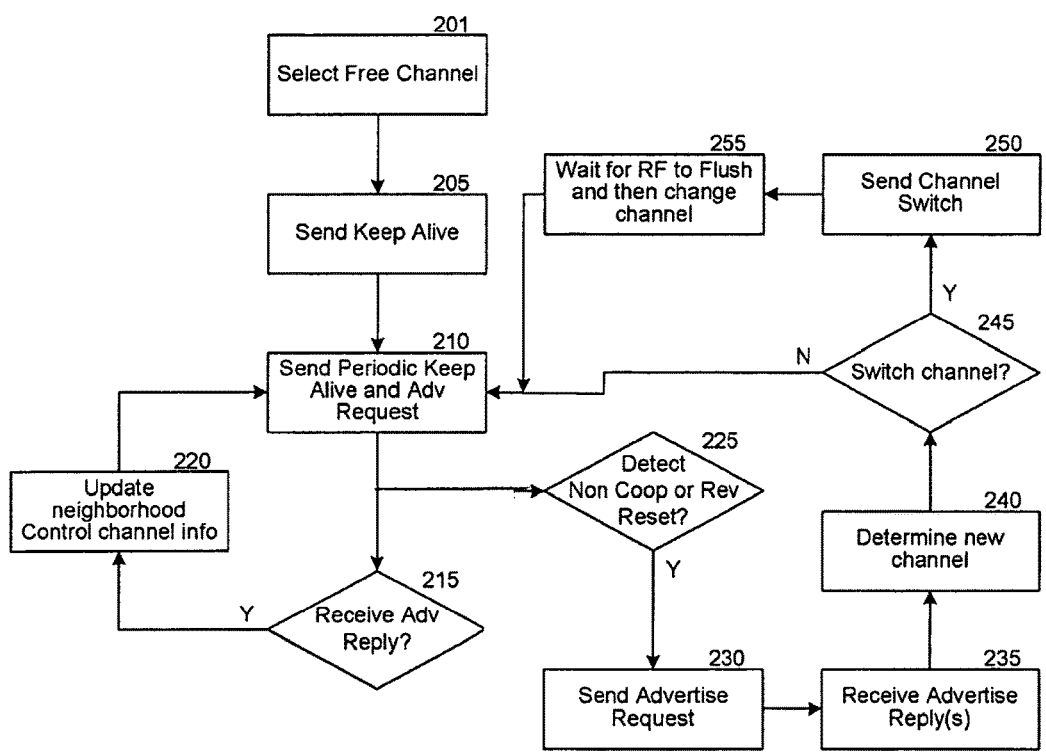
FIG. 2 illustrates the rendezvous process for a base station node.

FIG. 2 illustrates an example rendezvous process for a BS node. In step 201, a free channel is selected. In step 205, a keep alive packet is transmitted. In step 210, periodic keep alive packets and advertise request packets are transmitted.

In step 215, if a reply to the advertise request packet is received, update can be made to neighborhood control channel information in step 220.

If a non-cooperative radio is detected or a reset is received in step 225, an advertise request packet can be transmitted in step 230. After a reply to the advertise request packet is received in step 235, a new channel can be determined in step 240. If a decision is made to switch to the new channel in step 245, then a channel switch is transmitted in step 250. After waiting for a flush, the channel can be changed in step 255 and the radio can resume sending periodic keep alive packets and advertise request packets in step 210. If a decision is made not to switch to the new channel in step 245, no switch will be made and the radio can resume sending periodic keep alive packets and advertise request packets in step 210.

Figure 3:
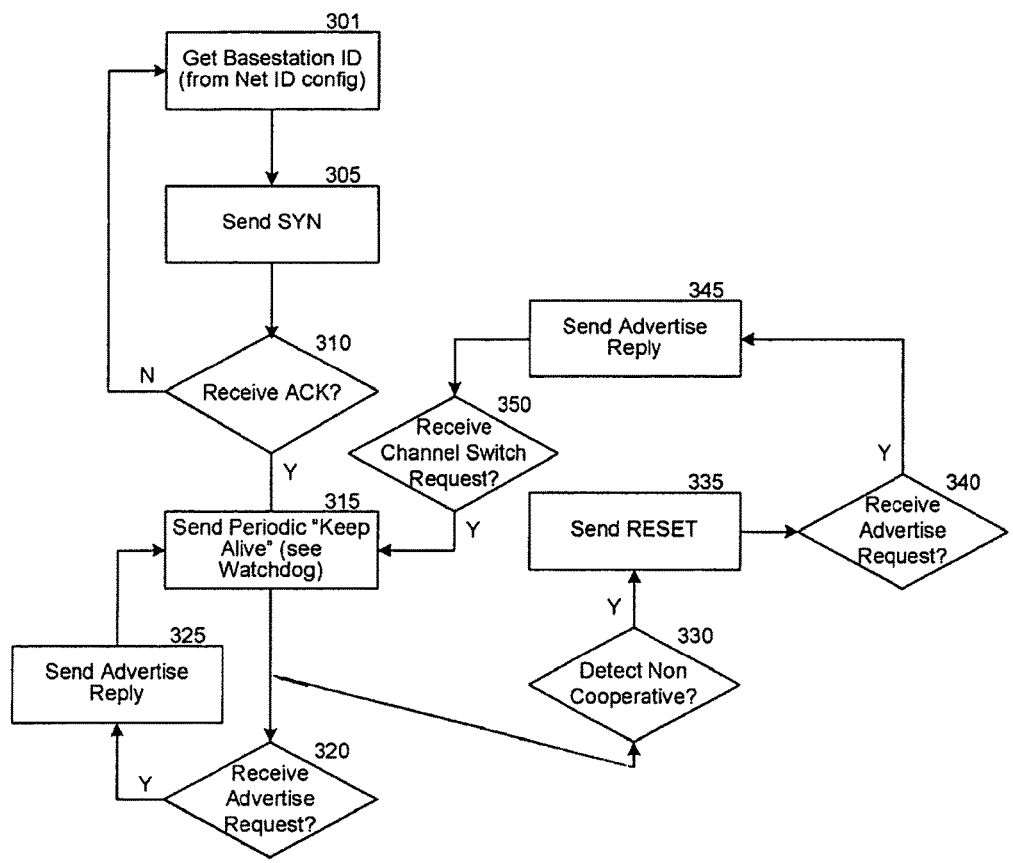
FIG. 3 illustrates the rendezvous process for a subscriber node.

FIG. 3 illustrates an example rendezvous process for an SU node. In step 301, a base station ID is acquired from a network ID configuration file. A synchronize packet can be transmitted in step 305. In step 310, it is determined whether an acknowledgement has been received. If no acknowledgement has been received, the base station will return to step 301 acquire a station ID from a network ID configuration file. If an acknowledgement is received in step 310, a periodic keep alive packet can be transmitted in step 315. If an advertise request packet is received in step 320, an advertise reply can be transmitted in step 325 and the base station will return to step 315 and send periodic keep alive packets. If a non-cooperative radio is detected in step 330, a reset will be transmitted in step 335. If an advertise request packet is subsequently received in step 340, an advertise reply will be sent in step 345. If a channel switch request is then received in step 350, the base station will return to step 315 and send periodic keep alive packets.

Considered in further detail, rendezvous module 110 can operate in at least three modes: (a) startup, (b) channel maintenance, and (c) channel switching. In some embodiments, channel switching can be triggered by the detection of non-cooperative interference. These modes are discussed in more detail below.

Startup

Upon cold start, the process for determining an operating channel frequency is begun. The process can vary depending upon the type of radio node.

Figure 4:
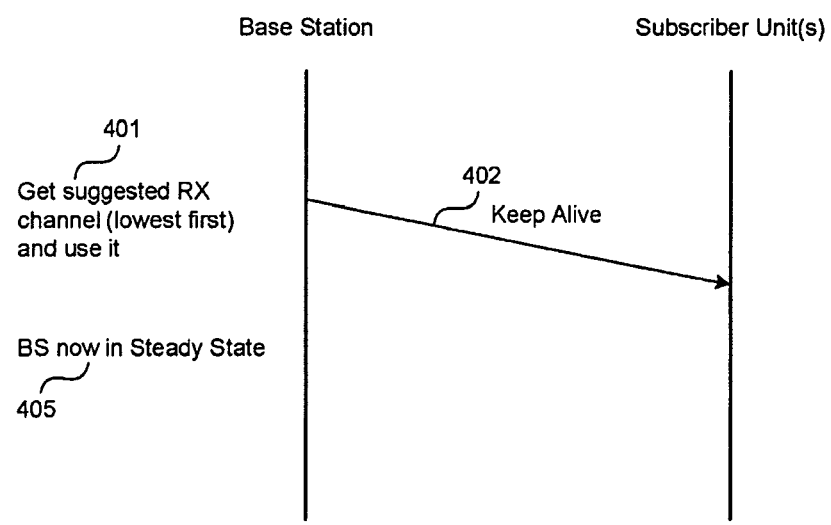
FIG. 4 illustrates a message sequence for a base station in startup mode.

For BS nodes in startup mode, a free channel is selected from a candidate channel list. (See step 201 in FIG. 2.) In some embodiments, the candidate channel list is provided by the spectrum manager. The selection from the candidate channel list can be performed such that the channel with a low or the lowest frequency (in Hz) is chosen to optimize or otherwise improve RF propagation. (See step 401 in FIG. 4.) The radio (through the radio interface module) is then commanded to operate on the selected frequency, and a keep alive packet is then transmitted. (See step 205 in FIG. 2 and step 402 in FIG. 4) As illustrated in the message sequence chart of FIG. 4, the base station can identify a suggested transmission channel 401 and transmit a keep alive packet to a subscriber unit in step 402. After transmission of the keep alive packet, the base station radio can transition to a steady state in step 405.

As non-limiting examples, the keep alive packet transmitted by the base station can include channel information, such as:

a) a preferred receive frequency on which other nodes can operate. In some embodiments, the frequency is the same frequency selected by the BS on which the keep alive is sent;

b) a number of other network nodes on a channel;

c) a number of candidate channels that are cleared for use. In some embodiments, the number is limited to 40 channels; and d) an actual list of candidate channels that are cleared for use (as determined by the BS).

The keep alive packet can also carry the geo-location of the BS radio node. In some embodiments, the geo-location can be latitude/longitude data. After the keep alive is transmitted, the BS node transitions into channel maintenance mode, which is described in more detail below.

For SU nodes in startup mode, a synchronize packet (SYN) is first sent to the BS radio node. (See step 305 in FIG. 3.) In some embodiments, the SU node acquires the BS node identifier and the BS preferred operating frequency from a file or database. The SYN packet can contain some or all of the types of channel information discussed above with regard to the keep alive packet. After sending the SYN packet, an SU node waits for an acknowledgement (ACK) from the BS node. (See step 310 in FIG. 3.) The ACK packet can contain a preferred frequency and other channel information or parameters upon which the SU should operate. After receiving and processing the ACK packet, an SU node transitions to the channel maintenance mode. (See step 315 in FIG. 3.)

Figure 5:
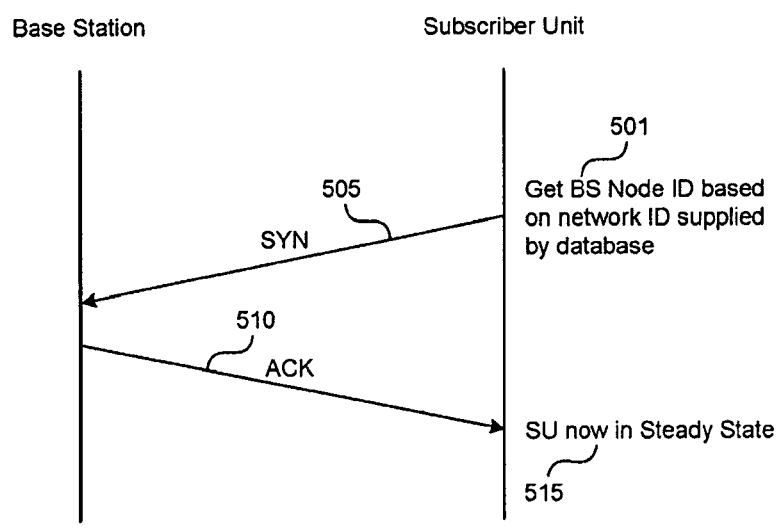
FIG. 5 illustrates a message sequence for a subscriber unit in startup mode.

As illustrated in the message sequence chart of FIG. 5, the subscriber unit can obtain a base station node ID based on a network ID supplied by a database in step 501. A SYN packet can be transmitted to one or more base stations in step 505. After receiving an acknowledgment from the base station in step 510, the subscriber unit can enter a steady state in step 515.

Channel Maintenance

Figure 6:
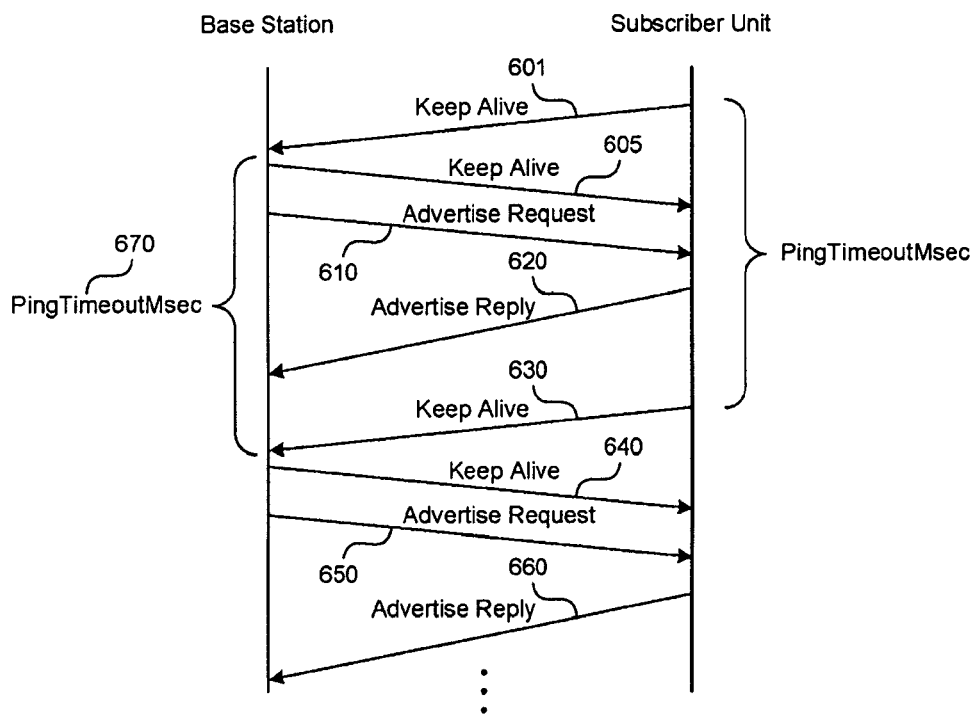
FIG. 6 illustrates a message sequence in channel maintenance mode.

A series of packets can be exchanged in the process of channel maintenance. FIG. 6 illustrates a message sequence chart summarizing channel maintenance behavior.

As illustrated in FIG. 6, a SU can send a keep alive packet in step 601. A BS node in channel maintenance mode can periodically send a keep alive packet 605 and send an advertise request packet (ARP) 610. After receipt of advertise reply 620 by the base station, the process can repeat in steps 630-660. In some embodiments, the periodic time interval, PingTimeoutMsec (670) can be determined by policy manager 115. The time interval could be set for any value, and in some embodiments, can be set to one second. These packets transmitted by the base station can be used to inform the subscriber units about the channel and/or RF environment as detected by the base station. As non-limiting examples, the channel and/or RF environment data can include preferred receive frequency, known network channels, and channel list. This information can be stored in a subscriber unit's neighborhood data structure, as discussed above.

An SU node in channel maintenance mode will periodically send a keep alive packet to its associated BS, as illustrated by steps 601 and 630 in FIG. 6. The time interval for sending the packet can be determined by the policy maker and, in some embodiments, can be set to one second. In addition, an SU can respond with an advertise reply packet each time it receives an advertise request packet from the BS. (See steps 620 and 660 in FIG. 6.) These packets can be used to inform the BS of the channel and/or RF environment as detected by the neighboring subscriber units. As non-limiting examples, the channel and/or RF environment can include preferred receive frequency, known network channels, and candidate channel list. This information can be stored the BS's neighborhood data structure, as discussed above and can be used during channel switching.

Channel Switching

At any time during channel maintenance mode, a radio node may detect a problem with the current operating channel via the spectrum manager subsystem. Some possible reasons for a problem with the current channel can include lost neighbors, an empty channel, and detection of a non-cooperative radio. Detection of a problem can cause the node to transition into channel switching mode.

Detecting a non-cooperative radio designates the current operating channel as a "primary channel." For SU nodes, the lost neighbors and empty channel cases can result in the node behaving as if it were at the beginning of the startup mode. In this mode, a BS node will find a new channel from its candidate list and transmit a keep alive packet. An SU node will send a SYN packet to a preconfigured BS ID on a preconfigured channel, as described above. In the case of a node detecting a non-cooperative radio, the behavior is different for each type of radio node.

Figure 7:
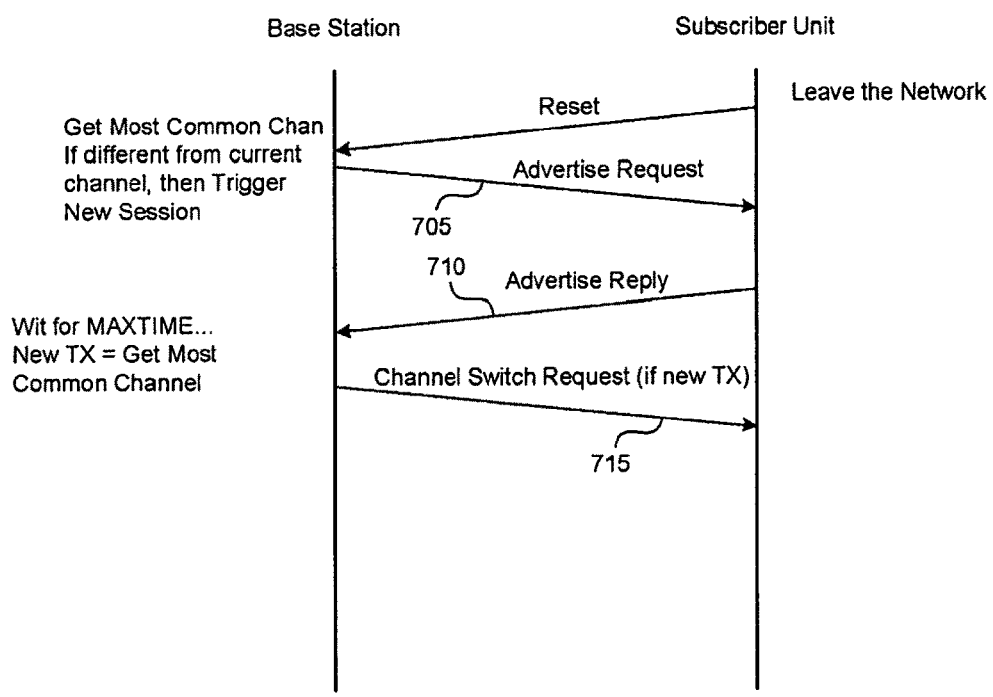
FIG. 7 illustrates a message sequence for a subscriber unit in channel switching mode.

The channel switching protocol for a base station is illustrated in FIG. 7. In step 705, a BS node will transmit an advertise request upon detecting a non-cooperative radio. The BS will then wait for an advertise reply from one or more of the SUs. In some embodiments, the BS can be configured to wait for 200 msec for the SUs to respond. A variable such as MAX_TIME_TO_WAIT_FOR_RESPOND can be used for this purpose. The advertise replies (step 710) received within this time frame provide the BS with information concerning the available channels identified by the responding SU. The BS can then select a new channel frequency to which to switch. In some embodiments, the selection can be based on the available channel that is most common to most or all of the SUs. The BS then transmits a channel switch request packet to SUs in step 715, notifying them of the new operating frequency. In some embodiments, the BS node can be configured to wait for 100 msec before commanding its own radio to the new operating frequency (for both transmit and receive). A variable such as TIME_TO_WAIT_FOR_RF_TO_FLUSH can be used for this purpose. The BS node will then transition back to the channel maintenance mode. An SU node that receives the channel switch request can change its operating channel frequency accordingly and then switch itself back to channel maintenance mode.

Figure 8:
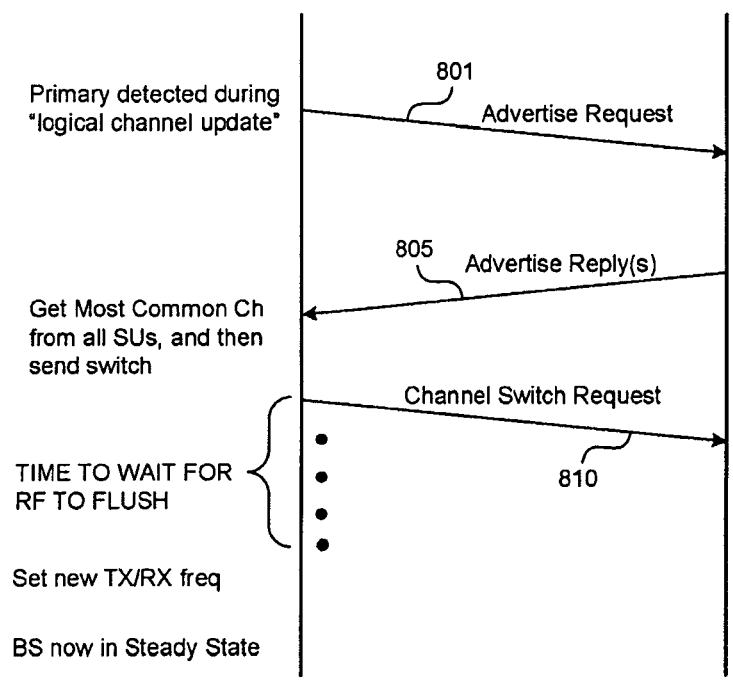
FIG. 8 illustrates a message sequence for a base station in channel switching mode.

A channel switching protocol for a base station is illustrated in FIG. 8. An SU node can send a reset packet to the BS upon detecting a non-cooperative radio. The BS will determine if a better channel is available, taking into account some or all known SUs. In some embodiments, the BS will check for the most common channel among all SUs. If this check results in the currently operating channel, then the BS takes no action and lets the SU drop off. However, if the common channel check results in a new channel frequency, the BS will start the channel switch process as described above, as if the BS had itself detected a non-cooperative node. In this case, the BS sends an advertise request (step 801), waits for and then processes any advertise replies (805), and then determines a new most common channel. By this procedure, the BS may be provided with the most recent information before selecting, and switching to, a new channel. After determining a new channel, the BS then sends a channel switch request packet (step 810) before switching its own radio to the new channel and transitioning back to channel maintenance mode. The SU nodes that receive the channel switch request change their operating channel frequency accordingly and then operate in channel maintenance mode.

Spectrum Manager

The spectrum manager 105 can be configured to maintain the state of multiple logical channels and establish the basis for the candidate channel list that rendezvous 110 uses and detecting when non-cooperative interference occurs on a channel. In some embodiments, the spectrum manager can operate according to one or more policies set by the policy manager. In such embodiments, the policy manager can provide multiple operating parameters as well as the list of allowable channels governed by the policy. Channels that are not available per the policy can be automatically marked as "Not Allowed."

The spectrum manager analyzes the output of the detector subsystem and characterizes allowable channels according to their RF signatures. Channels can be periodically analyzed, and if an appropriate signature is found, then the channel can be marked as a control channel. Similarly, if a non-cooperative transmitter is detected, then the channel can be marked as a primary channel, the rendezvous subsystem can be immediately notified, and a channel switch potentially triggered. Channels that have neither network nor non-cooperative signals are marked as cleared. Furthermore, a channel state can be marked as cleared if the channel had previously been marked as either network or non-cooperative and a certain amount of time has elapsed without another detection of network or non-cooperative signals. In some embodiments, channels for which there is not enough data from the detector shall be marked as non-cleared.

The state of multiple channels can be maintained in real-time or near real-time, as the spectrum manager periodically analyzes and updates channel states. In some embodiments, the analysis and update can be performed every 100 milliseconds as well as whenever the detector completes a scan. The channels marked as network and cleared can be included in the list of candidate channels that is utilized by rendezvous. Network signals may be relevant to SUs, while cleared channels may be relevant to BSs.

Note that the designations of a logical channel are not limited to designations as either network or primary (i.e., non-cooperative). Additional designations can include: cooperative signal present only, cooperative signal and weak uncooperative detected, cooperative signal and strong uncooperative detected, weak uncooperative signal detected, strong uncooperative signal detected, network signal present with weak uncooperative signal, network signal present with strong uncooperative signal, network signal present with cooperative and weak uncooperative signals, network signal present with cooperative and strong uncooperative signals, network signal present over 80% of snapshot, and strong noise present.

The spectrum manager module can be implemented by a spectrum exec module. The spectrum exec module is illustrated in FIG. 1B as a unit of spectrum manager 105. The spectrum exec module can operate according to certain parameters set by the policy manager. These parameters can include channel size (e.g., 2 MHz, comprised of 1.75 MHz signal bandwidth plus a 0.25 MHz guard band), maximum number of channels, spectrum low, spectrum high, scan timeout (relevant to time to live), time to live (time period to keep a channel marked as primary after no more detections), network time to live (time period to keep a channel marked as network after no more detections), policy start frequency, policy stop frequency, predetermined detection threshold, detect frequency low (in some embodiments, the same as spectrum low frequency), and detect frequency high (in some embodiments, the same as spectrum high frequency).

Additional parameters can include the bin bandwidth, which, in some embodiments, can be set to be 25 kHz. The detector outputs the RF energy contained within each bin, and spectrum exec determines the state of channels by analyzing bins within the channel.

As described above, the spectrum exec can maintain the state of a channel, based on information from both the policy manager and the detector. The primary outputs of spectrum exec can include the candidate channel list that is used by rendezvous and a trigger that is sent to rendezvous upon detecting non-cooperative interference.

The spectrum exec can define multiple channel states. As non-limiting examples, a channel may be defined to have one or more of the following states:

a) Not allowed: This may be set by the policy maker.

b) Not cleared: In some embodiments, can be set if channel frequency is outside bounds of detect frequency range. In other embodiments, can be set when not enough data has been collected to determine a valid state of the channel.

c) Cleared: Indicates that neither network nor non-cooperative signals were recently detected on the channel.

d) Primary: A non-cooperative signal has been detected.

e) Control: Denotes a live network channel; multiple control channels may be detected.

f) Data: In some embodiments, may indicate a channel is being used for data transfer.

g) In use: In some embodiments, may indicate a channel is a control channel and a data channel.

Spectrum exec can be triggered by any one of multiple events. For example, spectrum exec can be triggered by a periodic timer (e.g., set for 100 msec) and one generated by a wide-band FFT detector (after a scan has been performed and via a callback function). In some embodiments, a proprietary detector can be used.

When triggered by the detector, the spectrum exec can execute two primary steps to update the channel state for some or all of the channels. First, a look-through process (described in more detail below) divides a logical channel into bins and characterizes a channel based on the RF energy within the bins as measured by the detector. Second, a channel update process updates the channel state by analyzing both the output of the look-through process and timing information (the current time and the elapsed time since the latest network or non-cooperative signal detection).

The look-through process considers the RF energy within the bin for some or all of the channels. For those channels, look-through counts the number of bins where the detected network power level is greater than a predetermined threshold parameter (in some embodiments, specified in dbm). When the number of bins is greater than a certain percentage (in some embodiments, 20%), the same number of bins of an abstract representation of the channel are marked as network and the abstract representation is time stamped with the current time.

If the channel does not qualify as a network channel, then the process is repeated with a lower threshold (predetermined threshold minus threshold variation) under certain circumstances (e.g., when the new threshold is above a certain estimated noise level). If the channel still does not meet the criteria (e.g., more than 20% of bins above the lower threshold) but does have at least one bin above the original threshold, then the same number of bins of the abstract representation of the channel are marked as primary and the abstract representation is time stamped with the current time.

At the conclusion of the look-through process, the channel update process can be invoked. The channel update process analyzes the abstract representation of logical channels constructed by the look-through process. For some or all of the logical channels between spectrum low and spectrum high (in some embodiments, these are the same as the scan bandwidth), the state of the channel is updated. For updated channels, its state is marked as not cleared when the channel frequency is either below the detect low frequency or above the detect high frequency parameters.

If not marked as not cleared, the bins for the abstract representation (as defined by the look-through process) of each channel are processed. If any bin within a channel has been marked as primary and has not expired (i.e., the time since the last non-cooperative detection is less than the time to live parameter value), then the channel state is marked as primary. Furthermore, when a logical channel is newly marked as primary (i.e., a non-cooperative signal is first detected), then rendezvous can be notified.

If no bins are marked as primary, then the abstract representation is checked for network designation. If a sufficient percentage (the same percentage used by the look-through process, for example 20%) of bins are marked as network and this designation has not expired (i.e., the time since the last network detection is less than the network time to live parameter value), then the channel state is marked as control.

If the checks for not cleared, primary, and control fail, then the channel state is set to cleared, concluding the channel update process. The cleared state corresponds to the case when neither a network signature nor a primary detection has occurred on a valid channel within the last time to live timeframe.

When spectrum exec is triggered by a periodic timer, the channel update process (described above) is executed. The periodic update to the channel states serves as a collector, so that when the detector is off, the state of the channels is validated by designating a channel state as cleared when the time to the last detection has exceeded the corresponding time to live limit.

Detector Interface

The detector interface subsystem provides the interface wrapper around the detector. The interface can support any type of detector, including, for example, wide-band FFT detector, narrow-band ultra-high sensitivity detector, group sensing detector and other proprietary or non-proprietary devices.

To control operation, the detector interface generates a periodic scan request to the detector. The detector interface controls the operation of the detector through parameter settings that are governed by the policy. The detector interface also processes scan results sent from the detector and forwards them to the spectrum manager module.

In some embodiments, the detector interface subsystem can be implemented on wide-band FFT and/or other detector modules. The detector interface can be implemented with two threads of control: one for periodically sending scan requests to the detector (by a scan scheduler), and the other for asynchronously reading and processing the scan results from the detector.

The detector interface can use a parameter (e.g., Requested_Scans_Per_Second) set by policy manager. The detector interface can also use certain parameters that characterize a particular detector's capabilities, such as scan bin size (Hz), maximum bins per scan, and scan Hz per msec.

The spectrum manager can control the initial operation of the detector interface by enabling an autoscan function and by specifying the high and low frequencies between which the detector can operate. Once autoscan is enabled and the frequency range is set, the detector interface periodically triggers the detector with a scan request. The amount of time that elapses between each scan request is set by policy manager. In some embodiments, the time can be set to 100 milliseconds (e.g., Requested Scans Per Second=10).

The frequency range over which a particular scan is performed may be a sub-band within the entire frequency range of the radio node, depending on the scan width that is set by the detector's hardware profile. In some embodiments, multiple scan results may be requested for each scan cycle (e.g., 100 msec).

For a given scan request, the detector interface subsystem can specify the following control parameters: bin size (in some embodiments, 25 kHz), high and low frequency for the scan, sample size (number of FFT points), processing (window to use for power spectral estimation; e.g., Rectwin, Hanning, Hamming, Bartlett, Welch, and Blackman), attenuation (dB), averaging, and spur reduction.

Before sending the scan request to the detector, the detector subsystem can synchronize itself with the modem. In some embodiments, the detector interface can disable the modem transmitter; in other embodiments the detector interface can synchronize to the modem power amplifier turning off. Once this occurs, the scan request is sent to the detector. While a detection is in process, access to the detector is restricted (e.g., additional scan requests are disallowed)

The detector interface can also read scan results from the detector as a response to a scan request. Upon receiving a scan result packet from the detector, the detector interface processes the results. If multiple scans were requested and the limit has not been reached at this point, a new scan request is sent to the detector. In some embodiments, 5 scans per request are performed, as per the hardware configuration file. Once the requested scans are complete, the detector interface processes the results and sends them to the spectrum manager subsystem. In some embodiments, only the results of the last scan are sent. In the case of a wide-band FFT detector, the modem transmitter may also be re-enabled.

As non-limiting examples, the following results can be compiled before sending to spectrum manager: detected power levels for some or al of the bins, scan width (the sub-band that was scanned), center frequency, scan completion time (approximate time when scan results were received), max bins per scan (in some embodiments, equal to 4096 per the detector hardware profile). The scan results are then sent to the spectrum manager, triggering the look-through and channel update processes.

To detect hardware faults (and other potential anomalies), the detector interface also includes a watchdog function. The watchdog runs periodically to determine whether a certain amount of time has elapsed without hearing from the detector. In some embodiments, the time is three seconds, and is based on a parameter in the hardware configuration file. If this time period has elapsed, then the detector interface pings the detector. If no response to this ping (or scan requests) is heard within the same time period, then the detector is logged as lost.

Policy Maker

In some embodiments, the policy manager can be used to load a policy file. As non-limiting examples, parameters that are set in the policy file can include: NodeId, MaxTxPower, MaxNodes, NumPolicies, UpdateChannelTime, RequestedScansPerSec, ScanTimeout, StrongDetectionThreshold, NodeTimeout, MaxReadChannelsToCheckAtOnce, AllowRendezvousToForceChanSwitch, AllowedFreqMin/Max, NodeType, and InitialNetworkId.

Additionally, frequency low, frequency high, and channel size parameters can be loaded for further policy options. In some embodiments, only a single policy is implemented. Spectrum Low (a parameter used system wide) specifies the lowest end of the frequency range for the radio node, and can be set to be the lowest frequency among all of the Frequency Low values of the policies. In some embodiments, 306 MHz can be specified as the Spectrum Low. Spectrum High (a parameter used system wide) specifies the highest end of the frequency range for the radio node, and can be set to be the highest frequency among all of the Frequency High values of the policies. In some embodiments, 407 MHz can be specified as the Spectrum Low. Channel Size (a parameter used system wide) can be set to be the narrowest frequency channel among all of the Channel Size values of the policies. In some embodiments, 1.75 MHz can be specified as the Channel Size.

Radio Interface

Upon power-up, the radio interface subsystem configures its own transmit/receive buffers and UDP/IP sockets for communication with the modem. It can set the transmit power based on the policy, and initializes the modem hardware. After initialization, the radio interface waits for packets inbound from the modem. When a packet is received, it processes the packet by invoking the appropriate subsystem (e.g., a process packet function in rendezvous). The radio interface also provides the interface used by the rendezvous module to set transmit and receive frequencies, and for transmitting packets through the modem.

As non-limiting examples, two modem types can be implemented: RadioUDP and RadioModem.

Database Manager Interface

The database manager interface (or spectrum database manager) can be used to provide the interface to a database (e.g., SQLite) that is used to store detector scan results. Upon power up, this module sets up internal data structures (e.g., FIFOs and access pools) and creates a database to store detector results. The database manager provides an interface for reading from and writing to the detector database. The write interface can be used by spectrum exec to store results.

Configuration Files

One or more configuration files can be used by the system. In some embodiments, one file can be used for policy configuration (PolicyFile.ini) and the other for hardware configuration (HwIniFile.ini).

An example policy file is illustrated in FIG. 9. In some embodiments, additional parameters can be implemented such as: NumPolicies, NodeType, InitialNetworkId, ScanHzPerScan and ScanHzPerMsec.

CONCLUSION

Many specific details of certain embodiments of the invention are set forth in the description and in FIGS. 1-10 to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the invention. As used herein, one or more components "coupled" to each other can be coupled directly (i.e., no other components are between the coupled components) or indirectly (i.e., one or more other components can be placed between the coupled components).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined or altered to provide further embodiments.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein.

The terminology used in the Detailed Description is intended to be interpreted in its broadest reasonable manner, even though it is being used in conjunction with a detailed description of certain specific embodiments of the invention. Certain terms may even be emphasized; however, any terminology intended to be interpreted in any restricted manner will be overtly and specifically defined as such in this Detailed Description section. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

The invention claimed is:

1. A method of operation of a dynamic spectrum access (DSA) device, said method comprising:
while operating in a first mode, selecting an initial startup operating channel frequency of the dynamic spectrum access device;
subsequent to selecting the initial startup operating channel frequency, entering a channel maintenance mode in which a plurality of communications are exchanged between the DSA device and at least one remote DSA device, at least one of the plurality of communications comprising an indication of the radio frequency environment in the region of a device sending the communication;
subsequent to selecting the initial startup operating channel frequency:
detecting a non-cooperative radio operating on the initial startup operating channel frequency; and
responsive to detecting the non-cooperative radio operating on the initial startup operating frequency, entering a channel switching mode in which a new operating channel frequency is selected for use by the DSA device based at least in part upon the indication of the radio frequency environment.

2. The method of claim 1, wherein the step of selecting the initial startup operating channel frequency further comprises:
selecting an available channel from a candidate channel list provided by a spectrum manager of the DSA device.

3. The method of claim 2, wherein the available channel has a lowest frequency from among a plurality of channels in the candidate channel list provided by the spectrum manager.

4. The method of claim 1, further comprising:
sending a synchronize request to a remote DSA device;
receiving an acknowledgement from the remote DSA device, the acknowledgement comprising an indication of a preferred frequency; and
selecting the preferred frequency as the initial startup operating channel frequency.

5. The method of claim 1, further comprising:
sending an advertise request to a remote DSA device;
receiving an advertise reply from the remote DSA device, the advertise reply comprising an indication of an available channel identified by the remote DSA device; and
selecting the new operating channel frequency based upon the indication of the available channel identified by the remote DSA device.

6. The method of claim 5, further comprising:
prior to sending the advertise request, receiving a reset packet from the remote DSA device, the reset packet indicating the presence of a non-cooperative radio.

7. The method of claim 5, further comprising:
sending an indication of the new operating channel frequency to the remote DSA device.

8. The method of claim 1, further comprising:
sending an indication of the new operating channel frequency to a remote DSA device.

9. The method of claim 1, further comprising:
detecting a non-cooperative radio operating on the initial startup operating channel frequency; and
sending a reset packet to a remote DSA device indicating the non-cooperative radio operating on the initial startup operating channel frequency.

10. The method of claim 9, further comprising:
receiving an advertise request from the remote DSA device; and sending an advertise reply to the remote DSA device, the advertise reply comprising an indication of an available channel identified by the DSA device.

11. The method of claim 1, further comprising:
receiving an advertise request from the remote DSA device; and
sending an advertise reply to the remote DSA device, the advertise reply comprising an indication of an available channel identified by the DSA device.

12. The method of claim 11, further comprising:
receiving an indication of the new operating channel frequency from the remote DSA device.

13. The method of claim 1, further comprising, while operating in the channel maintenance mode:
maintaining a list of a plurality of channels, each channel in the plurality of channels being categorized as one of: not allowed based on a policy, not cleared, cleared, primary, control, data, or in use.

14. A DSA system comprising:
a first DSA device; and
a second DSA device;
wherein the first DSA device is configured to operate in a first mode, during which the device selects an initial startup operating channel frequency, and subsequent to selecting the initial startup operating channel frequency, enters a channel maintenance mode in which a plurality of communications are exchanged between the first DSA device and the second DSA device, at least one of the plurality of communications comprising an indication of the radio frequency environment in the region of a device sending the communication, and subsequent to selecting the initial startup operating channel frequency, the first DSA device enters a channel switching mode in which a new operating channel frequency is selected for use based at least in part upon the indication of the radio frequency environment; and
wherein the first DSA device enters the channel switching mode in response to a detection of a non-cooperative radio operating on the initial startup operating channel frequency.

15. The system of claim 14, wherein the first DSA device is a base station.

16. The system of claim 14, wherein the first DSA device is a subscriber unit.

17. The system of claim 14, wherein the first DSA device comprises a spectrum manager that provides a candidate channel list from which the new operating channel frequency is selected.

18. The system of claim 14, wherein, while operating in the first mode, the first DSA device is configured to send a synchronize request to the second DSA device, to receive an acknowledgement from the second DSA device comprising an indication of a preferred frequency, and to select the preferred frequency as the initial startup operating channel frequency.

19. The system of claim 14, wherein, while operating in the channel maintenance mode, the first DSA device is configured to:

send an advertise request to the second device;
receive an advertise reply from the second DSA device, the advertise reply comprising an indication of an available channel identified by the second DSA device; and
select the new operating channel frequency based upon the indication of the available channel identified by the second DSA device.

20. The system of claim 19, wherein the first DSA device is configured to send, subsequent to selecting the new operating channel frequency, an indication of the new operating channel frequency to the second DSA device.

21. The system of claim 14, wherein the second DSA device is configured to:
detect a non-cooperative radio operating on the initial startup operating channel frequency; and
responsive to detecting the non-cooperative radio operating on the initial startup operating channel frequency, send a reset packet to the first DSA device indicating the non-cooperative radio operating on the initial startup operating channel frequency.

22. The system of claim 14, wherein the second DSA device is configured to:
receive an advertise request from the first DSA device; and
send an advertise reply to the first DSA device, the advertise reply comprising an indication of an available channel identified by the second DSA device.

23. The system of claim 14, wherein the first DSA device is further configured to maintain, while operating in the channel maintenance mode, a list of a plurality of channels, each channel in the plurality of channels being categorized as one of: not allowed based on a policy, not cleared, cleared, primary, control, data, or in use.

24. The method of claim 1, wherein the initial startup operating channel frequency is selected prior to environmental sensing performed on the initial startup operating channel frequency.

25. The method of claim 1, wherein the initial startup operating channel frequency is selected prior to the DSA device communicating with the at least one remote DSA device.

26. The method of claim 1, wherein the initial startup operating channel frequency is selected independently of the indication of the radio frequency environment.

27. The system of claim 14, wherein the DSA device is configured to select the initial startup operating channel frequency prior to performing environmental sensing on the initial startup operating channel frequency.

28. The system of claim 14, wherein the DSA device is configured to select the initial startup operating channel frequency prior to the DSA device communicating with the at least one remote DSA device.

29. The system of claim 14, wherein the DSA device is configured to select the initial startup operating channel frequency independently of the indication of the radio frequency environment.

* * * * *